US012718733B2

(12) United States Patent
Zhu

(10) Patent No.: US 12,718,733 B2
(45) Date of Patent: Aug. 25, 2026

(54) DISPLAY DRIVING METHOD AND ELECTRONIC DEVICE WITH ENHANCED ELECTROSTATIC DISCHARGE PROTECTION

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Lin Zhu, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 79 days.

(21) Appl. No.: 18/569,228

(22) PCT Filed: Oct. 16, 2023

(86) PCT No.: PCT/CN2023/124678
§ 371 (c)(1),
(2) Date: Dec. 12, 2023

(87) PCT Pub. No.: WO2024/164549
PCT Pub. Date: Aug. 15, 2024

(65) Prior Publication Data

US 2025/0087132 A1 Mar. 13, 2025

(30) Foreign Application Priority Data

Feb. 6, 2023 (CN) ........................ 202310149809.X

(51) Int. Cl.
*G09G 3/36* (2006.01)
*G09G 3/20* (2006.01)
*G02F 1/1333* (2006.01)

(52) U.S. Cl.
CPC ............ *G09G 3/2092* (2013.01); *G09G 3/36* (2013.01); *G02F 1/133334* (2021.01);
(Continued)

(58) Field of Classification Search
CPC .......... G09G 3/20; G09G 3/2092; G09G 3/36; G09G 2320/0247; G09G 2330/04; G02F 1/133334
See application file for complete search history.

(56) References Cited

U.S. PATENT DOCUMENTS

2010/0033453 A1* 2/2010 Park .................... G09G 3/3648 345/204
2011/0169800 A1 7/2011 Jun
(Continued)

FOREIGN PATENT DOCUMENTS

CN 1413049 A 4/2003
CN 101645245 A 2/2010
(Continued)

OTHER PUBLICATIONS

International Search Report in International application No. PCT/CN2023/124678, mailed on Feb. 8, 2024.
(Continued)

*Primary Examiner* — Adam J Snyder
(74) *Attorney, Agent, or Firm* — PV IP PC; Peter Stecher; Wei Te Chung

(57) ABSTRACT

A display driving method, a display driving device, and an electronic device. The display driving method includes: obtaining a voltage value of a power supply ground signal; obtaining a reference data enable signal and a data enable
(Continued)

S101: obtaining a voltage value of a power supply ground signal

S102: obtaining a reference data enable signal and a data enable signal to be analyzed if the voltage value of the power supply ground signal is greater than or equal to an electrostatic discharge voltage threshold S103: adjusting the data enable signal to be analyzed according to the reference data enable signal to obtain a current frame data enable signal S104: writing the current frame data enable signal to a timing controller signal to be analyzed when the voltage value of the power supply ground signal is greater than or equal to an electrostatic discharge voltage threshold; adjusting the data enable signal to be analyzed according to the reference data enable signal to obtain a current frame data enable signal; and writing the current frame data enable signal to a timing controller.

17 Claims, 2 Drawing Sheets

(52) U.S. Cl.
CPC ....... *G09G 3/20* (2013.01); *G09G 2320/0247* (2013.01); *G09G 2330/04* (2013.01)

(56) References Cited

U.S. PATENT DOCUMENTS

| | | | | |
|---|---|---|---|---|
| 2013/0215090 | A1* | 8/2013 | Kim | G09G 3/36 345/204 |
| 2019/0204694 | A1* | 7/2019 | Wang | G09G 3/3677 |

FOREIGN PATENT DOCUMENTS

| | | | | | |
|---|---|---|---|---|---|
| CN | 102543015 | A | | 7/2012 | |
| CN | 103258511 | A | | 8/2013 | |
| CN | 103745705 | A | | 4/2014 | |
| CN | 103996388 | A | | 8/2014 | |
| CN | 107068092 | A | | 8/2017 | |
| CN | 107731193 | A | | 2/2018 | |
| CN | 109036309 | A | | 12/2018 | |
| CN | 109427276 | A | | 3/2019 | |
| CN | 109427276 | B | * | 7/2021 | G09G 3/20 |
| KR | 20030031621 | A | | 4/2003 | |
| KR | 20060135133 | A | | 12/2006 | |
| KR | 20180039232 | A | | 4/2018 | |
| KR | 20200082597 | A | * | 7/2020 | G09G 3/20 |
| WO | 2019184355 | A1 | | 10/2019 | |

OTHER PUBLICATIONS

Written Opinion of the International Search Authority in International application No. PCT/CN2023/124678, mailed on Feb. 8, 2024.
Chinese Office Action issued in corresponding Chinese Patent Application No. 202310149809.X dated Aug. 16, 2025, pp. 1-8.

* cited by examiner

DISPLAY DRIVING METHOD AND ELECTRONIC DEVICE WITH ENHANCED ELECTROSTATIC DISCHARGE PROTECTION

CROSS REFERENCE TO RELATED APPLICATIONS

This application is a US national phase application based upon an International Application No. PCT/CN2023/124678, filed on Oct. 16, 2023, which claims the priority of Chinese Patent Application No. 202310149809.X, filed on Feb. 6, 2023, the disclosures of which are incorporated herein by reference in its entirety.

FIELD OF INVENTION

The present disclosure relates to a field of display technology, specifically to a display driving method, a display driving device, and an electronic device.

BACKGROUND

Currently, with popularity of liquid crystal panels, consumers have higher and higher requirements for display, and they also have higher and higher requirements for an anti-static capability of a whole machine. Currently, all liquid crystal panels mass-produced in the industry are mass-produced according to electrostatic discharge (ESD) class B as a standard (that is, no black screen, and when screens flicker, the liquid crystal panels can recover). In ESD class B, signals such as a data enable (DE) signal and a circuit start (STV) signal are interfered, causing flickering H thin lines; a protection mechanism of a timing controller (TCON) is triggered, causing flickering H black belt; and a judgment mechanism of pulse width>V blanking is triggered, causing a flickering screen. These abnormalities are caused by different TCON protection mechanisms being triggered due to different levels of interference on signals such as DE and STV signals.

SUMMARY

Embodiments of the present disclosure provide a display driving method, a display driving device, and an electronic device, which adjust a data enable signal to be analyzed according to a reference data enable signal when ESD occurs, thereby improving an ESD capability and an anti-interference capability of a liquid crystal panel.

In a first aspect, an embodiment of the present disclosure provides a display driving method, comprising:

- obtaining a voltage value of a power supply ground signal;
- obtaining a reference data enable signal and a data enable signal to be analyzed when the voltage value of the power supply ground signal is greater than or equal to an electrostatic discharge voltage threshold;
- adjusting the data enable signal to be analyzed according to the reference data enable signal to obtain a current frame data enable signal, wherein the reference data enable signal is a previous frame data enable signal of the data enable signal to be analyzed, replacing the data enable signal to be analyzed with the previous frame data enable signal to obtain the current frame data enable signal, wherein the current frame data enable signal is same as the previous frame data enable signal; or counting a clock signal number of the data enable signal to be analyzed; determining a first number of clock signals in the previous frame data enable signal as a first supplementary signal when the clock signal number is less than a preset number threshold, wherein the first number is a difference between the preset number threshold and the clock signal number; supplementing the data enable signal to be analyzed according to the first supplementary signal to obtain the current frame data enable signal; and
- writing the current frame data enable signal to a timing controller.

In a second aspect, an embodiment of the present disclosure provides a display driving method, comprising:

- obtaining a voltage value of a power supply ground signal;
- obtaining a reference data enable signal and a data enable signal to be analyzed when the voltage value of the power supply ground signal is greater than or equal to an electrostatic discharge voltage threshold;
- adjusting the data enable signal to be analyzed according to the reference data enable signal to obtain a current frame data enable signal; and
- writing the current frame data enable signal to a timing controller.

In a third aspect, an embodiment of the present disclosure provides a display driving device, comprising:

- an information acquisition module configured to obtain a voltage value of a power supply ground signal;
- a signal acquisition module communicatively connected to the information acquisition module and configured to obtain a reference data enable signal and a data enable signal to be analyzed when the voltage value of the power supply ground signal is greater than or equal to the electrostatic discharge voltage threshold; and
- a signal adjustment module communicatively connected to the signal acquisition module and configured to adjust the data enable signal to be analyzed according to the reference data enable signal to obtain a current frame data enable signal and write the current frame data enable signal into a timing controller.

In a fourth aspect, an embodiment of the present disclosure provides an electronic device, comprising a processor, a memory, and computer program instructions stored in the memory and executable by the processor to perform the display driving method as provided above.

In the display driving method, the display driving device, and the electronic device provided by the embodiments of the present disclosure, determine whether ESD occurs based on the obtained voltage value of the power supply ground signal. If the voltage value of the power supply ground signal is greater than or equal to the electrostatic discharge voltage threshold, i.e. ESD occurs, the data enable signal to be analyzed and written to the timing controller is directly adjusted according to the reference data enable signal. There is no need to determine whether the data enable signal to be analyzed is abnormal. Adjustment is made directly when it is determined that ESD occurs, which prevents interfered data enable signals from being written into the timing controller, thereby improving the ESD capability and the anti-interference capability of a liquid crystal panel.

BRIEF DESCRIPTION OF DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

To help a person skilled in the art better understand the solutions of the present disclosure, the following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The term “first”, “second” are for illustrative purposes only and are not to be construed as indicating or imposing a relative importance or implicitly indicating the number of technical features indicated. Thus, a feature that limited by “first”, “second” may expressly or implicitly include at least one of the features.

In the description of the present disclosure, the meaning of “plural” is two or more, unless otherwise specifically defined.

Figure 1:
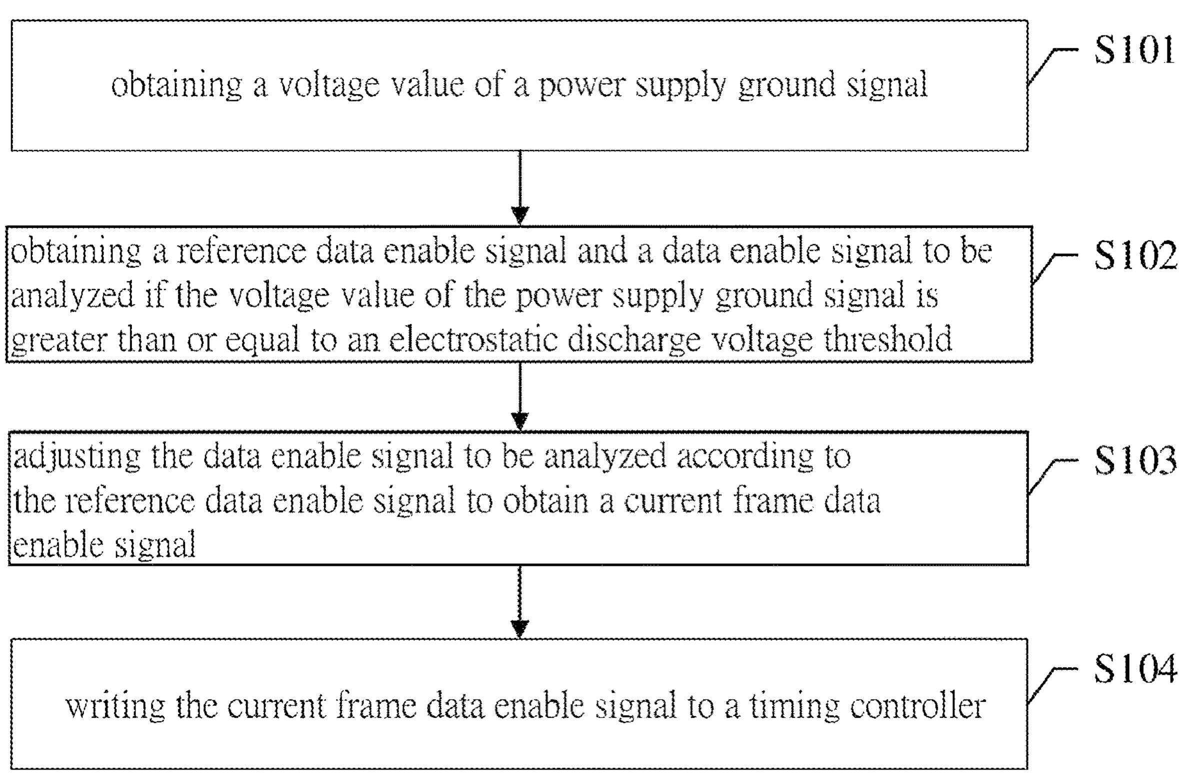
FIG. 1 is a schematic flowchart of a display driving method according to an embodiment of the present disclosure.

Please refer to FIG. 1, an embodiment of the present disclosure provides a display driving method, which comprises steps S101 to S104.

S101: obtaining a voltage value of a power supply ground signal.

Specifically, a voltage value of a power supply ground signal is generally 0 or low. However, when ESD occurs, a current flows from a power supply ground to a chip of a timing controller (TCON). A voltage value of the power supply ground signal is obtained. Determine whether ESD occurs based on the voltage value of the power supply ground signal. If ESD occurs, a data enable (DE) signal needs to be processed to prevent the data enable signal from being interfered by ESD and causing a poor display effect. The DE signal is a valid data strobe signal, also called a valid data signal. The DE signal is a high-level active signal. A video data signal corresponding to a high-level period of the DE signal is considered to be a valid data signal.

S102: obtaining a reference data enable signal and a data enable signal to be analyzed when the voltage value of the power supply ground signal is greater than or equal to an electrostatic discharge voltage threshold.

Specifically, the electrostatic discharge voltage threshold is set based on ESD generation conditions. If the voltage value of the power supply ground signal is greater than or equal to the electrostatic discharge voltage threshold, it is determined that ESD has occurred. If the voltage value of the power ground signal is less than the electrostatic discharge voltage threshold, it is determined that ESD has not occurred.

If ESD occurs, the data enable signal needs to be processed to obtain a reference data enable signal and a data enable signal to be analyzed. The reference data enable signal comprises a preset one-frame data enable signal template and/or a previous frame data enable signal of the data enable signal to be analyzed. The data enable signal contains several clock signals (CLKs), and the clock signals are arranged in a preset format. The one-frame data enable signal template is a frame of clock signals arranged in a preset format. The previous frame data enable signal is a previous frame signal adjacent to the data enable signal to be analyzed. The previous frame data enable signal has been verified to have no interference signal and has been written and stored in the chip of the timing controller.

S103: adjusting the data enable signal to be analyzed according to the reference data enable signal to obtain a current frame data enable signal.

Specifically, the data enable signal contains several clock signals. If ESD occurs, the data enable signal may be interfered, resulting in missing or extra parts of the clock signals. The data enable signal to be analyzed is adjusted according to the reference data enable signal to obtain the current frame data enable signal with a normal number of the clock signals. In this embodiment, the data enable (DE) signal is adjusted, and the circuit start (STV) signal changes with the data enable signal, so a problem of the STV signal being interfered by ESD can also be solved.

In one embodiment, the reference data enable signal is the previous frame data enable signal of the data enable signal to be analyzed. This step comprises S201: replacing the data enable signal to be analyzed with the previous frame data enable signal to obtain the current frame data enable signal. The current frame data enable signal is same as the previous frame data enable signal.

Figure 2:
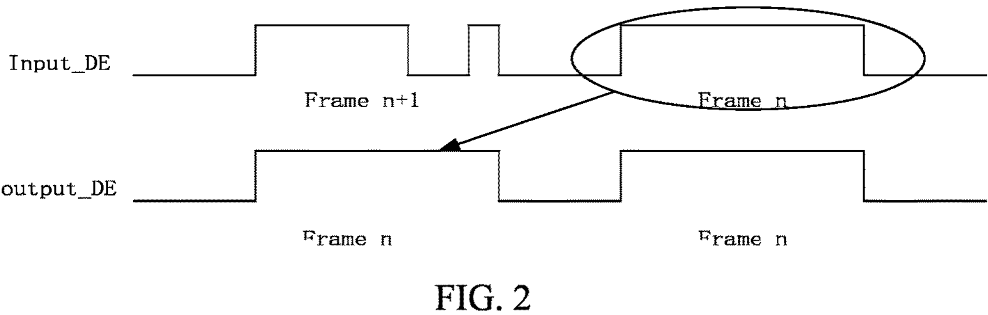
FIG. 2 is a schematic diagram of a supplementary method for a data enable signal to be analyzed according to an embodiment of the present disclosure.

Specifically, the reference data enable signal is the previous frame data enable signal of the data enable signal to be analyzed. The previous frame data enable signal of the data enable signal to be analyzed has been verified to have no interference signal and has been written and stored in the chip of the timing controller. Without any analysis of the data enable signal to be analyzed, the data enable signal to be analyzed is directly replaced with the previous frame data enable signal to obtain the current frame data enable signal. The current frame data enable signal is the same as the previous frame data enable signal. That is, the previous frame data enable signal is written repeatedly. Regardless of whether the data enable signal to be analyzed is interfered, replace it directly to avoid affecting a display effect. As shown in FIG. 2, Input_DE is the obtained data enable signal of each frame, Output_DE is the data enable signal written to the timing controller, Frame n in Input_DE is the previous frame data enable signal of the data enable signal to be analyzed, Frame n+1 in Input_DE is the data enable signal to be analyzed, and a signal written to the timing controller corresponding to Frame n+1 in Output_DE is the previous frame data enable signal in Input_DE, that is, Frame n.

In one embodiment, the reference data enable signal is the previous frame data enable signal of the data enable signal to be analyzed. The step S103 of adjusting the data enable signal to be analyzed according to the reference data enable signal to obtain the current frame data enable signal comprises S301: counting a clock signal number of the data enable signal to be analyzed; S302: determining a first number of clock signals in the previous frame data enable signal as a first supplementary signal when the clock signal number is less than a preset number threshold, wherein the first number is a difference between the preset number threshold and the clock signal number; and S303: supplementing the data enable signal to be analyzed according to the first supplementary signal to obtain the current frame data enable signal.

Specifically, the reference data enable signal is still the previous frame data enable signal of the data enable signal to be analyzed. This embodiment differs from the aforementioned embodiment in that in this embodiment, only an interfered part of the data enable signal to be analyzed is adjusted instead of directly replacing an entire frame signal.

The clock signal number of the data enable signal to be analyzed is counted. The data enable signal to be analyzed contains several clock signals. The clock signal number is a number of the clock signals in the data enable signal to be analyzed, which can be determined by counting a number of rising edges or falling edges in the data enable signal to be analyzed. The data enable signal to be analyzed contains a signal terminator, so the step S301 is to count the number of signals before the signal terminator in the data enable signal to be analyzed.

If the data enable signal to be analyzed is interfered by ESD, it will generally result in missing or redundant clock signals. Therefore, a normal clock signal number of a data enable signal that is not interfered is set to the preset number threshold. If the clock signal number of the data enable signal to be analyzed is equal to the preset number threshold, it means that the data enable signal to be analyzed is not interfered, so the data enable signal to be analyzed is directly used as the current frame data enable signal.

If the clock signal number of the data enable signal to be analyzed is less than the preset number threshold, a signal fragment in the previous frame data enable signal of the data enable signal to be analyzed is intercepted to supplement the missing clock signals in the data enable signal to be analyzed.

The difference between the preset number threshold and the clock signal number of the data enable signal to be analyzed is calculated as the first number. That is, the data enable signal to be analyzed needs to be supplemented with the first number of clock signals. Therefore, the first number of clock signals in the previous frame data enable signal is determined to be the first supplementary signal.

Then, the first supplementary signal is supplemented to the data enable signal to be analyzed to obtain the current frame data enable signal, and a signal terminator of the previous frame data enable signal is used as a signal terminator of the current frame data enable signal. The first supplementary signal may be added anywhere in the data enable signal to be analyzed. In this embodiment, the signal fragment in the previous frame data enable signal supplements the missing clock signals in the data enable signal to be analyzed, so that the signal distortion is minimized after supplementation, thereby improving an ESD capability and an anti-interference capability of a liquid crystal panel.

Figure 3:
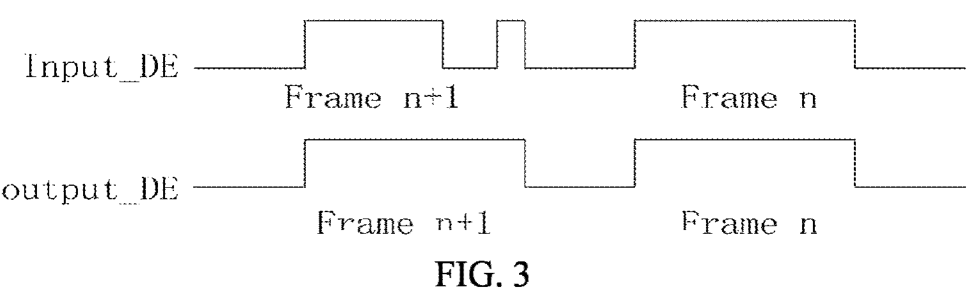
FIG. 3 is another schematic diagram of a supplementary method for a data enable signal to be analyzed according to an embodiment of the present disclosure.

As shown in FIG. 3, Input_DE is the obtained data enable signal of each frame, Output_DE is the data enable signal written to the timing controller, Frame n in Input_DE is the previous frame data enable signal of the data enable signal to be analyzed, Frame n+1 in Input_DE is the data enable signal to be analyzed, and a signal written to the timing controller corresponding to Frame n+1 in Output_DE is a signal after supplementing based on Frame n+1 in Input_DE.

In one embodiment, after the step S301 of counting the clock signal number of the data enable signal to be analyzed, the display driving method further comprises S401: analyzing the data enable signal to be analyzed to obtain a first interfered signal of the data enable signal to be analyzed and a first signal node of the first interfered signal when the clock signal number is less than a preset number threshold; S402: obtaining clock signals corresponding to the first signal node in the previous frame data enable signal as a second supplementary signal; and S403: supplementing the first interfered signal of the data enable signal to be analyzed according to the second supplementary signal to obtain the current frame data enable signal.

Specifically, the data enable signal contains several clock signals, and the clock signals are arranged in a preset format. When the clock signal number of the data enable signal to be analyzed is less than the preset number threshold, when the clock signals that are missing due to interference in the data enable signal to be analyzed are supplemented by clock signals arranged in the preset format, the supplemented clock signals will be more consistent with an actual situation.

The data enable signal to be analyzed is analyzed to obtain the first interfered signal in the data enable signal to be analyzed and the first signal node of the first interfered signal. The data enable signal to be analyzed is a high-level active signal. A video data signal corresponding to a high-level period of the data enable signal to be analyzed is considered to be a valid data signal, so the first interfered signal is a low-level signal.

According to the first signal node of the first interfered signal, the clock signals corresponding to the first signal node are found in the previous frame data enable signal. The clock signals corresponding to the first signal node in the previous frame data enable signal is intercepted as the second supplementary signal. The second supplementary signal is supplemented to the first signal node of the data enable signal to be analyzed to obtain the current frame data enable signal.

In one embodiment, after the step S301 of counting the clock signal number of the data enable signal to be analyzed, the display driving method further comprises S501: determining the clock signals whose number is equal to the preset number threshold in the data enable signal to be analyzed to be the current frame data enable signal when the clock signal number is greater than the preset number threshold.

Specifically, when the clock signal number of the data enable signal to be analyzed is greater than the preset number threshold, an excess number of clock signals in the data enable signal to be analyzed are removed. The difference between the preset number threshold and the clock signal number of the data enable signal to be analyzed is calculated as the first number. That is, the first number of clock signals needs to be removed from the data enable signal to be analyzed. The first number of clock signals that are consecutively arranged starting from any position in the data enable signal to be analyzed may be removed. Preferably, in order to ensure continuity of previous and subsequent frame images, the clock signals whose number is equal to the preset number threshold in the data enable signal to be analyzed may be directly used as the current frame data enable signal, and a signal terminator of the data enable signal to be analyzed may be used as the signal terminator of the current frame data enable signal.

In one embodiment, the step S302 of determining the first number of clock signals in the previous frame data enable signal as the first supplementary signal when the clock signal number is less than the preset number threshold comprises S601: determining the first number of clock signals that are consecutively arranged starting from any position in the previous frame data enable signal as the first supplementary signal when the clock signal number is less than the preset number threshold.

Specifically, when the clock signal number is less than the preset number threshold, the first number of clock signals in the previous frame data enable signal is determined to be the first supplementary signal. In order to minimize mutation of the obtained current frame data enable signal, the first supplementary signal is the first number of clock signals that are consecutively arranged in the previous frame data enable signal, but the first supplementary signal may be the clock signals that are consecutively arranged starting from any position in the previous frame data enable signal, which is not specifically limited in this embodiment. Correspondingly, the first supplementary signal may be supplemented to any position in the data enable signal to be analyzed. However, in order to minimize impact on the data enable signal to be analyzed itself, the first supplementary signal is preferably supplemented to a head or a tail of the data enabling signal to be analyzed.

In one embodiment, when the reference data enable signal is a preset one-frame data enable signal template, the step S103 of adjusting the data enable signal to be analyzed according to the reference data enable signal to obtain the current frame data enable signal comprises S701: comparing the data enable signal to be analyzed with the preset one-frame data enable signal template to obtain a second interfered signal of the data enable signal to be analyzed and a second signal node of the second interfered signal; and S702: supplementing the second interfered signal of the data enable signal to be analyzed according to a signal format corresponding to the second signal node in the preset one-frame data enable signal template to obtain the current frame data enable signal.

Specifically, the data enable signal contains several clock signals, and the clock signals are arranged in a preset format. The preset one-frame data enable signal template is a frame of clock signals arranged in a preset format. If the data enable signal to be analyzed is interfered by ESD, some of its clock signals will be abnormal. Clock signals of a node adjacent to the interfered clock signals in the data enable signal to be analyzed may be analyzed based on the preset one-frame data enable signal template, and the interfered clock signals may be supplemented. It should be noted that this embodiment is more suitable for applications where clock signals are missing, that is, the clock signal number of data enable signals to be analyzed is less than the preset number threshold.

The data enable signal to be analyzed is compared with the preset one-frame data enable signal template to obtain the second interfered signal of the data enable signal to be analyzed and the second signal node of the second interfered signal. Similarly, the second interfered signal is a low-level signal.

The second interfered signal of the data enable signal to be analyzed is supplemented according to the signal format corresponding to the second signal node in the preset one-frame data enable signal template and clock signals of nodes before and after the second signal node in the data enable signal to be analyzed to obtain the current frame data enable signal.

S104: writing the current frame data enable signal to a timing controller.

Specifically, the current frame data enable signal obtained through the steps of the above embodiment does not have a clock signal interfered by ESD, so the current frame data enable signal is written to the timing controller and is called by a display panel to drive display.

In one embodiment, after this step, the display driving method further comprises S801: obtaining a voltage value of a new power supply ground signal; and S802: when the voltage value of the new power supply ground signal is greater than or equal to the electrostatic discharge voltage threshold, adjusting a new data enable signal to be analyzed according to the reference data enable signal to obtain a new current frame data enable signal until a voltage value of a power supply ground signal obtained for an Nth time is less than the electrostatic discharge voltage threshold. N is a positive integer greater than or equal to 2. The reference data enable signal comprises the previous frame data enable signal and/or the preset one-frame data enable signal template.

Specifically, after processing a data enable signal to be analyzed in a certain frame according to the steps of the above embodiment, a voltage value of a new power supply ground signal is obtained to determine whether it is still in an ESD state. If yes, a new data enable signal to be analyzed is processed according to the steps of the above embodiment. After each frame of data enable signal to be analyzed is processed, a voltage value of a new power supply ground signal is obtained to determine whether it is still in the ESD state. Afterward, when a voltage value of a power supply ground signal obtained for an Nth time is less than the electrostatic discharge voltage threshold, there is no need to process s data enable signal to be analyzed. N is a positive integer greater than or equal to 2.

It is noted that when multiple frames of data enable signals to be analyzed are processed, one same method in the above embodiment may be used for supplementation, or a combination of multiple methods in the above embodiment may be used for supplementation, which is not specifically limited in this embodiment.

In this embodiment, when ESD occurs, a data enable signal to be analyzed is adjusted according to a reference data enable signal, thereby improving an ESD capability and an anti-interference capability of a liquid crystal panel.

Figure 4:
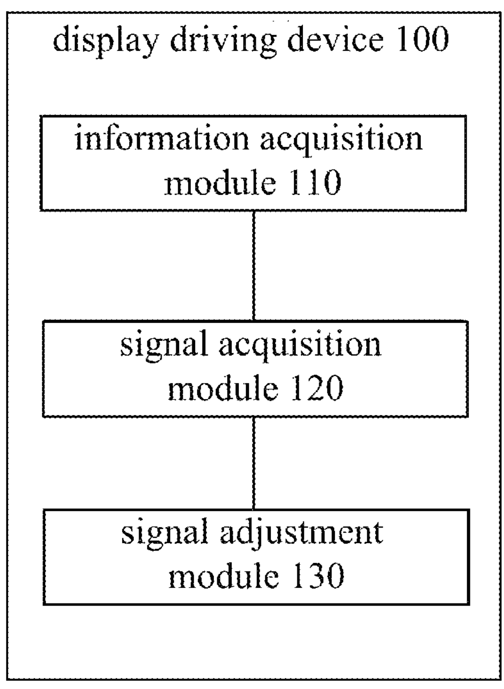
FIG. 4 is a schematic structural diagram of a display driving device according to an embodiment of the present disclosure.

In order to better implement the display driving method in the embodiment of the present disclosure, based on the display driving method, the embodiment of the present disclosure further provides a display driving device. As shown in FIG. 4, the display driving device 100 comprises:

an information acquisition module 110 configured to obtain a voltage value of a power supply ground signal;

a signal acquisition module 120 communicatively connected to the information acquisition module 110 and configured to obtain a reference data enable signal and a data enable signal to be analyzed when the voltage value of the power supply ground signal is greater than or equal to the electrostatic discharge voltage threshold; and a signal adjustment module 130 communicatively connected to the signal acquisition module 120 and configured to adjust the data enable signal to be analyzed according to the reference data enable signal to obtain a current frame data enable signal and write the current frame data enable signal into a timing controller.

In some embodiment of the present disclosure, the reference data enable signal is a previous frame data enable signal of the data enable signal to be analyzed. The signal adjustment module 130 is also configured to replace the data enable signal to be analyzed with the previous frame data enable signal to obtain the current frame data enable signal, wherein the current frame data enable signal is same as the previous frame data enable signal.

In some embodiment of the present disclosure, the reference data enable signal is a previous frame data enable signal of the data enable signal to be analyzed. The signal adjustment module 130 is also configured to count a clock signal number of the data enable signal to be analyzed; to determine a first number of clock signals in the previous frame data enable signal as a first supplementary signal when the clock signal number is less than a preset number threshold, where the first number is a difference between the preset number threshold and the clock signal number; and to supplement the data enable signal to be analyzed according to the first supplementary signal to obtain the current frame data enable signal.

In some embodiment of the present disclosure, the signal adjustment module 130 is also configured to analyze the data enable signal to be analyzed to obtain a first interfered signal of the data enable signal to be analyzed and a first signal node of the first interfered signal when the clock signal number is less than a preset number threshold; to obtain clock signals corresponding to the first signal node in the previous frame data enable signal as a second supplementary signal; and to supplement the first interfered signal of the data enable signal to be analyzed according to the second supplementary signal to obtain the current frame data enable signal.

In some embodiment of the present disclosure, the signal adjustment module 130 is also configured to determine the clock signals whose number is equal to the preset number threshold in the data enable signal to be analyzed to be the current frame data enable signal when the clock signal number is greater than the preset number threshold.

In some embodiment of the present disclosure, the signal adjustment module 130 is also configured to determine the first number of clock signals consecutively arranged starting from any position in the previous frame data enable signal as the first supplementary signal when the clock signal number is less than the preset number threshold.

In some embodiment of the present disclosure, the reference data enable signal is a preset one-frame data enable signal template. The signal adjustment module 130 is also configured to compare the data enable signal to be analyzed with the preset one-frame data enable signal template to obtain a second interfered signal of the data enable signal to be analyzed and a second signal node of the second interfered signal; to supplement the second interfered signal of the data enable signal to be analyzed according to a signal format corresponding to the second signal node in the preset one-frame data enable signal template to obtain the current frame data enable signal.

In some embodiment of the present disclosure, the signal adjustment module 130 is also configured to obtain a voltage value of a new power supply ground signal. When the voltage value of the new power supply ground signal is greater than or equal to the electrostatic discharge voltage threshold, the signal adjustment module 130 is further configured to adjust a new data enable signal to be analyzed according to the reference data enable signal to obtain a new current frame data enable signal until a voltage value of a power supply ground signal obtained for an Nth time is less than the electrostatic discharge voltage threshold, where N is a positive integer greater than or equal to 2, and the reference data enable signal is a previous frame data enable signal or a preset one-frame data enable signal template.

In the foregoing embodiments, the descriptions of each embodiment have their own emphases, and for parts not described in detail in a certain embodiment, reference may be made to relevant descriptions of other embodiments.

In some embodiments of the present disclosure provide an electronic device, which comprises one or more processors, a memory, and one or more computer program instructions. The one or more application programs are stored in the memory and are configured to be executed by the processors to perform the steps of the above display driving method. The steps of the display driving method herein may be the steps in the display driving method of any one of the aforementioned embodiments.

In some embodiments of the present disclosure provides a computer readable storage media storing computer program instructions. The computer program instructions are executed by a controller to the steps of the above display driving method. The steps of the display driving method herein may be the steps in the display driving method of any one of the aforementioned embodiments.

The technical features of the above embodiments can be combined in any way. To simplify the description, not all possible combinations of the technical features in the above embodiments are described. However, as long as there is no contradiction in the combination of these technical features, all possible combinations should be used. It is considered to be within the scope of this specification.

The display driving method, the display driving device, the electronic device, and a computer readable storage media provided by the embodiments of the present disclosure are described in detail above. The present disclosure uses specific examples to describe principles and implementations of the present disclosure. The above description of the embodiments is only for helping to understand solutions and core ideas of the present disclosure. Furthermore, those skilled in the art may make modifications to the specific embodiments and applications according to ideas of the present disclosure. In conclusion, the present specification should not be construed as a limitation to the present disclosure.

What is claimed is:

1. A display driving method, comprising:

obtaining a voltage value of a power supply ground signal;

in response to the voltage value of the power supply ground signal being greater than or equal to an electrostatic discharge voltage threshold, obtaining a data enable signal to be analyzed, and obtaining, from a timing controller, a previous frame data enable signal stored in the timing controller as a reference data enable signal;

adjusting the data enable signal to be analyzed according to the reference data enable signal to obtain a current frame data enable signal; and writing the current frame data enable signal to the timing controller;

wherein the data enable signal to be analyzed is an unadjusted data enable signal belonging to a current frame that has not been written into the timing controller; the reference data enable signal is the previous frame data enable signal of the data enable signal to be analyzed, the previous frame data enable signal having been verified to be free of interference signal and already written to and stored in the timing controller; the adjusting the data enable signal to be analyzed according to the reference data enable signal to obtain the current frame data enable signal comprises:

counting a clock signal number of the data enable signal to be analyzed;

extracting a first number of clock signals from the previous frame data enable signal as a first supplementary signal in response to the clock signal number being less than a preset number threshold, wherein the first number is a difference between the preset number threshold and the clock signal number; and supplementing the first supplementary signal to a head or a tail of the data enable signal to be analyzed to obtain the current frame data enable signal, wherein the first supplementary signal is a signal fragment of the previous frame data enable signal corresponding to the first number of clock signals.

2. The display driving method according to claim 1, wherein the adjusting the data enable signal to be analyzed according to the reference data enable signal to obtain the current frame data enable signal comprises:

replacing the data enable signal to be analyzed with the previous frame data enable signal to obtain the current frame data enable signal, wherein the current frame data enable signal is same as the previous frame data enable signal.

3. The display driving method according to claim 1, after the counting the clock signal number of the data enable signal to be analyzed, further comprising:

analyzing the data enable signal to be analyzed to obtain a first interfered signal of the data enable signal to be analyzed and a first signal node of the first interfered signal when the clock signal number is less than a preset number threshold;

obtaining clock signals corresponding to the first signal node in the previous frame data enable signal as a second supplementary signal; and supplementing the first interfered signal of the data enable signal to be analyzed according to the second supplementary signal to obtain the current frame data enable signal.

4. The display driving method according to claim 1, after the counting the clock signal number of the data enable signal to be analyzed, further comprising:

determining the clock signals whose number is equal to the preset number threshold in the data enable signal to be analyzed to be the current frame data enable signal when the clock signal number is greater than the preset number threshold.

5. The display driving method according to claim 1, after the counting the clock signal number of the data enable signal to be analyzed, further comprising:

removing the first number of clock signals that are consecutively arranged starting from any position in the data enable signal to be analyzed to obtain the current frame data enable signal when the clock signal number is greater than the preset number threshold.

6. The display driving method according to claim 1, after the counting the clock signal number of the data enable signal to be analyzed, further comprising:

when the clock signal number is greater than the preset number threshold, determining the clock signals whose number is equal to the preset number threshold in the data enable signal to be analyzed as the current frame data enable signal, and determining a signal terminator of the data enable signal to be analyzed as a signal terminator of the current frame data enable signal.

7. The display driving method according to claim 1, wherein the determining the first number of clock signals in the previous frame data enable signal as the first supplementary signal when the clock signal number is less than the preset number threshold comprises:

determining the first number of clock signals consecutively arranged starting from any position in the previous frame data enable signal as the first supplementary signal when the clock signal number is less than the preset number threshold.

8. The display driving method according to claim 1, after the counting the clock signal number of the data enable signal to be analyzed, further comprising:

determining the data enable signal to be analyzed as the current frame data enable signal when the clock signal number is equal to the preset number threshold.

9. The display driving method according to claim 1, wherein the reference data enable signal is a preset one-frame data enable signal template, and the adjusting the data enable signal to be analyzed according to the reference data enable signal to obtain the current frame data enable signal comprises:

comparing the data enable signal to be analyzed with the preset one-frame data enable signal template to obtain a second interfered signal of the data enable signal to be analyzed and a second signal node of the second interfered signal; and supplementing the second interfered signal of the data enable signal to be analyzed according to a signal format corresponding to the second signal node in the preset one-frame data enable signal template to obtain the current frame data enable signal.

10. The display driving method according to claim 9, wherein the preset one-frame data enable signal template is a frame of clock signals arranged in a preset format.

11. The display driving method according to claim 1, after the writing the current frame data enable signal to the timing controller, further comprising:

obtaining a voltage value of a new power supply ground signal; and when the voltage value of the new power supply ground signal is greater than or equal to the electrostatic discharge voltage threshold, adjusting a new data enable signal to be analyzed according to the reference data enable signal to obtain a new current frame data enable signal until a voltage value of a power supply ground signal obtained for an Nth time is less than the electrostatic discharge voltage threshold, wherein N is a positive integer greater than or equal to 2, and the reference data enable signal is a previous frame data enable signal or a preset one-frame data enable signal template.

12. An electronic device, comprising a timing controller, a processor, a memory, and computer program instructions stored in the memory and executable by the processor to cause the processor to perform operations comprising:

obtaining a voltage value of a power supply ground signal;

in response to the voltage value of the power supply ground signal being greater than or equal to an electrostatic discharge voltage threshold, obtaining a data enable signal to be analyzed, and obtaining, from a timing controller, a previous frame data enable signal stored in the timing controller as a reference data enable signal;

adjusting the data enable signal to be analyzed according to the reference data enable signal to obtain a current frame data enable signal; and writing the current frame data enable signal to the timing controller;

wherein the data enable signal to be analyzed is an unadjusted data enable signal belonging to a current frame that has not been written into the timing controller; the reference data enable signal is the previous frame data enable signal of the data enable signal to be analyzed, the previous frame data enable signal having been verified to be free of interference signal and already written to and stored in the timing controller; the adjusting the data enable signal to be analyzed according to the reference data enable signal to obtain the current frame data enable signal comprises:

counting a clock signal number of the data enable signal to be analyzed;

extracting a first number of clock signals from the previous frame data enable signal as a first supplementary signal in response to the clock signal number being less than a preset number threshold, wherein the first number is a difference between the preset number threshold and the clock signal number; and supplementing the first supplementary signal to a head or a tail of the data enable signal to be analyzed to obtain the current frame data enable signal, wherein the first supplementary signal is a signal fragment of the previous frame data enable signal corresponding to the first number of clock signals.

13. The electronic device according to claim 12, wherein the adjusting the data enable signal to be analyzed according to the reference data enable signal to obtain the current frame data enable signal comprises:

replacing the data enable signal to be analyzed with the previous frame data enable signal to obtain the current frame data enable signal, wherein the current frame data enable signal is same as the previous frame data enable signal.

14. The electronic device according to claim 12, wherein after the counting the clock signal number of the data enable signal to be analyzed, the operations further comprise:

analyzing the data enable signal to be analyzed to obtain a first interfered signal of the data enable signal to be analyzed and a first signal node of the first interfered signal when the clock signal number is less than a preset number threshold;

obtaining clock signals corresponding to the first signal node in the previous frame data enable signal as a second supplementary signal; and supplementing the first interfered signal of the data enable signal to be analyzed according to the second supplementary signal to obtain the current frame data enable signal.

15. The electronic device according to claim 12, wherein after the counting the clock signal number of the data enable signal to be analyzed, the operations further comprise:

determining the clock signals whose number is equal to the preset number threshold in the data enable signal to be analyzed to be the current frame data enable signal when the clock signal number is greater than the preset number threshold.

16. The electronic device according to claim 12, wherein after the counting the clock signal number of the data enable signal to be analyzed, the operations further comprise:

removing the first number of clock signals that are consecutively arranged starting from any position in the data enable signal to be analyzed to obtain the current frame data enable signal when the clock signal number is greater than the preset number threshold.

17. The electronic device according to claim 12, wherein after the counting the clock signal number of the data enable signal to be analyzed, the operations further comprise:

when the clock signal number is greater than the preset number threshold, determining the clock signals whose number is equal to the preset number threshold in the data enable signal to be analyzed as the current frame data enable signal, and determining a signal terminator of the data enable signal to be analyzed as a signal terminator of the current frame data enable signal.

* * * * *